Figure 1:
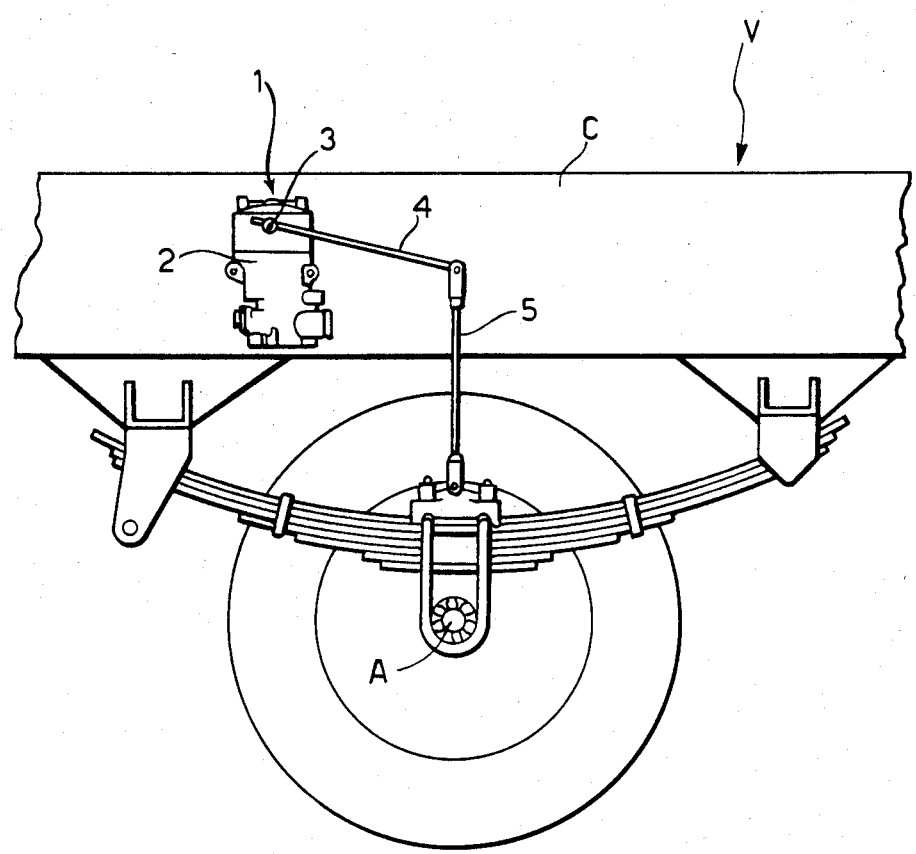

United States Patent [19]

Angelillo

[11] Patent Number: 4,726,626

[45] Date of Patent: Feb. 23, 1988

[54] SERVO BRAKE AUTOMODULATOR FOR TRAILERS WITH PNEUMATIC BRAKE SYSTEMS

[75] Inventor: Domenico Angelillo, Sesto S. Giovanni, Italy

[73] Assignee: Magneti Marelli S.p.A., Milan, Italy

[21] Appl. No.: 914,230

[22] Filed: Oct. 2, 1986

[30] Foreign Application Priority Data

Oct. 2, 1985 [IT] Italy .............................. 67841 A/85

[51] Int. Cl.$^4$ ........................... B60T 8/18; B60T 13/00
[52] U.S. Cl. ..................................... 303/22 R; 303/9; 188/195
[58] Field of Search ................ 303/9, 14, 22 A, 22 R, 303/6 R, 40

[56] References Cited

U.S. PATENT DOCUMENTS 4,143,924  3/1979  Coypland .......................... 303/22 R

FOREIGN PATENT DOCUMENTS 2013298  8/1979  United Kingdom ............. 303/22 R

*Primary Examiner*—Andres Kashnikow
*Assistant Examiner*—Timothy Newholm
*Attorney, Agent, or Firm*—Sughrue, Mion, Zinn, Macpeak & Seas

[57] ABSTRACT

The servo automodulator is intended for connection to the brake system of the tractor vehicle through a power pipeline, called the automatic pipeline, and a control pipeline called the variable pipeline. This device comprises a body with first and second inlet connectors for connection to the variable pipeline and to the automatic pipeline respectively, an inlet/outlet connector and an outlet connector for connection to a pressure reservoir and to the brake members of the trailer. A non-return valve allows air to flow from the second inlet connector to the inlet/outlet connector to supply compressed air to the reservoir. The body houses a valve system for putting the inlet/outlet connector in communication with the outlet connector when the first inlet connector is supplied with a brake-actuation pressure, and a brake-pressure modulator device which controls the opening of the valve assembly, and hence the brake pressure, in dependence on the load bearing on the trailer. The body also houses a distributor control member which assumes a normal working position, in which it allows communication between the first inlet connector and a control chamber of the brake pressure modulator when the second inlet connector is supplied with pressurized air. The distributor member can move to an emergency position, in which it cuts off communication between the first inlet connector and the said chamber and in which it puts this chamber in communication with the inlet/outlet connector, when the pressure upstream of the non-return valve falls below a predetermined value, for example as a result of rupture of the automatic pipeline.

8 Claims, 3 Drawing Figures

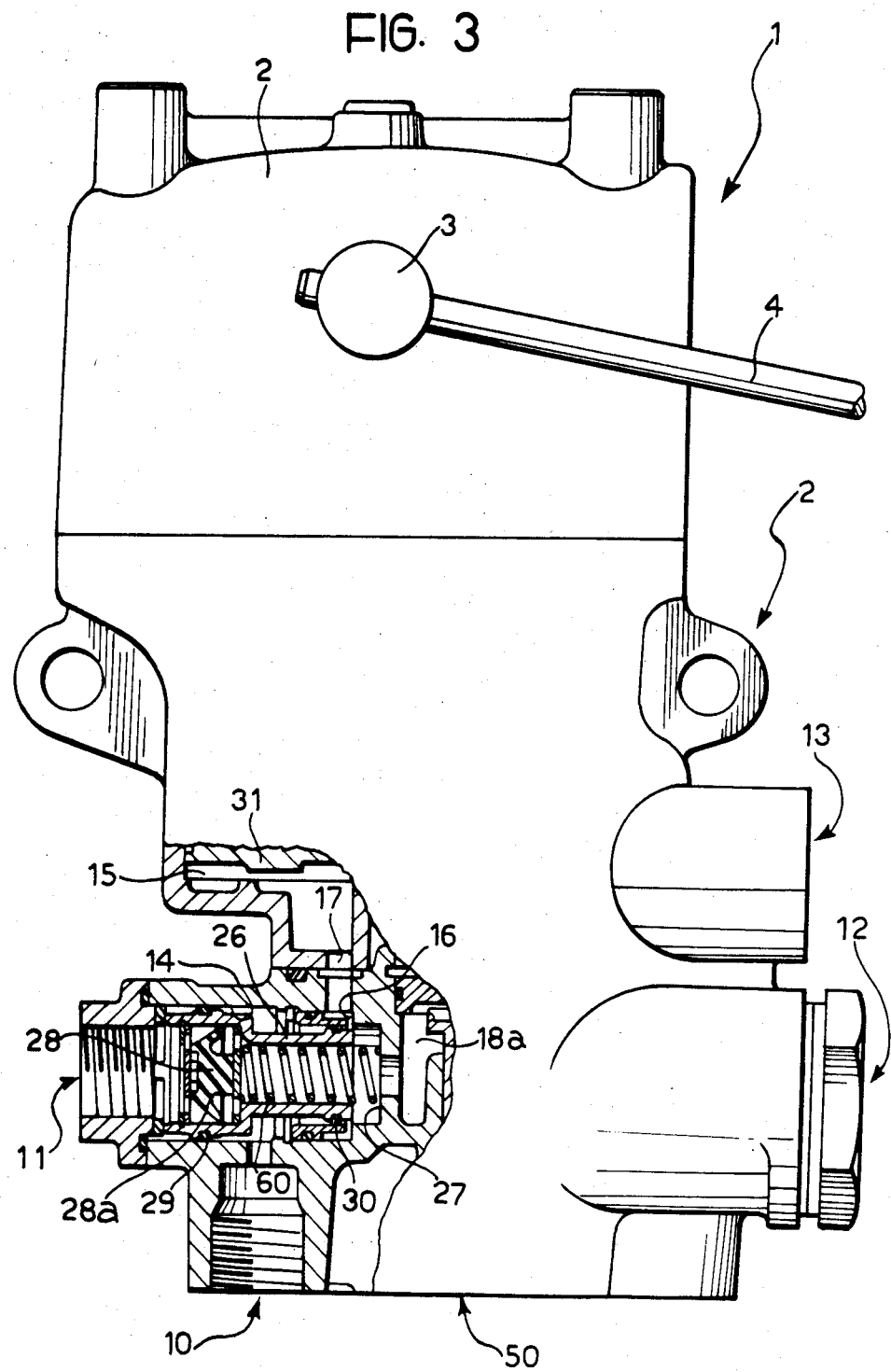

SERVO BRAKE AUTOMODULATOR FOR TRAILERS WITH PNEUMATIC BRAKE SYSTEMS

The present invention relates to a servo brake automodulator for a trailer having a pneumatic brake system connectible to the system of the tractor vehicle through a power pipeline, called the variable pipeline.

More particularly the invention relates to a servo auto modulator of the type comprising a body for fixing to a suspended part of the trailer and having first and second inlet connectors for connection to the variable pipeline and to the automatic pipeline respectively, an inlet/outlet connector and an outlet connector for connection to a pressure reservoir and to the brake members of the trailer respectively, a one-way flow valve mounted in the body and arranged to allow pressurised air to flow from the second inlet connector to the inlet/outlet connector to supply compressed air to the reservoir, a valve assembly mounted in the body and arranged to put the inlet/outlet connector in communication with the outlet connector when a brake-operating pressure is applied to the first inlet connector, and a brake pressure modulator device including an operating piston movable in a chamber communicating with the first inlet connector and means for sensing the load bearing on the trailer; the modulator device being arranged to control the opening of the valve assembly, and hence the brake pressure, in dependence on the load bearing on the trailer and the pressure supplied to the said chamber.

Known devices of this type put the brake members in direct connection with the pressure reservoir for the trailer if the automatic pipeline breaks: the trailer is braked with a braking force corresponding to the maximum pressure in the reservoir, which may reach values of, for example, about 7 bar. Braking is thus rather sharp, particularly when the trailer is not fully loaded or is, in fact, quite empty.

The object of the present invention is to provide a servo brake automodulator for trailers which avoids the disadvantage described above.

This object is achieved according to the invention by a servo automodulator of the type specified above, characterised in that it includes a control distributor member movably mounted in the body and arranged to take up a normal working position in which it allows communication between the first inlet connector and the said chamber when the said second inlet connector is supplied with pressurized air; the distributor member being movable to an emergency position in which it breaks the communication between the first inlet connector and the said chamber and in which it puts the chamber in communication with the inlet/outlet connector when the pressure of the air upstream of the one-way flow valve falls below a predetermined value, whereby the pressure applied through the outlet connector to the brake members in these conditions is also a function of the load bearing on the trailer.

Figure 2:
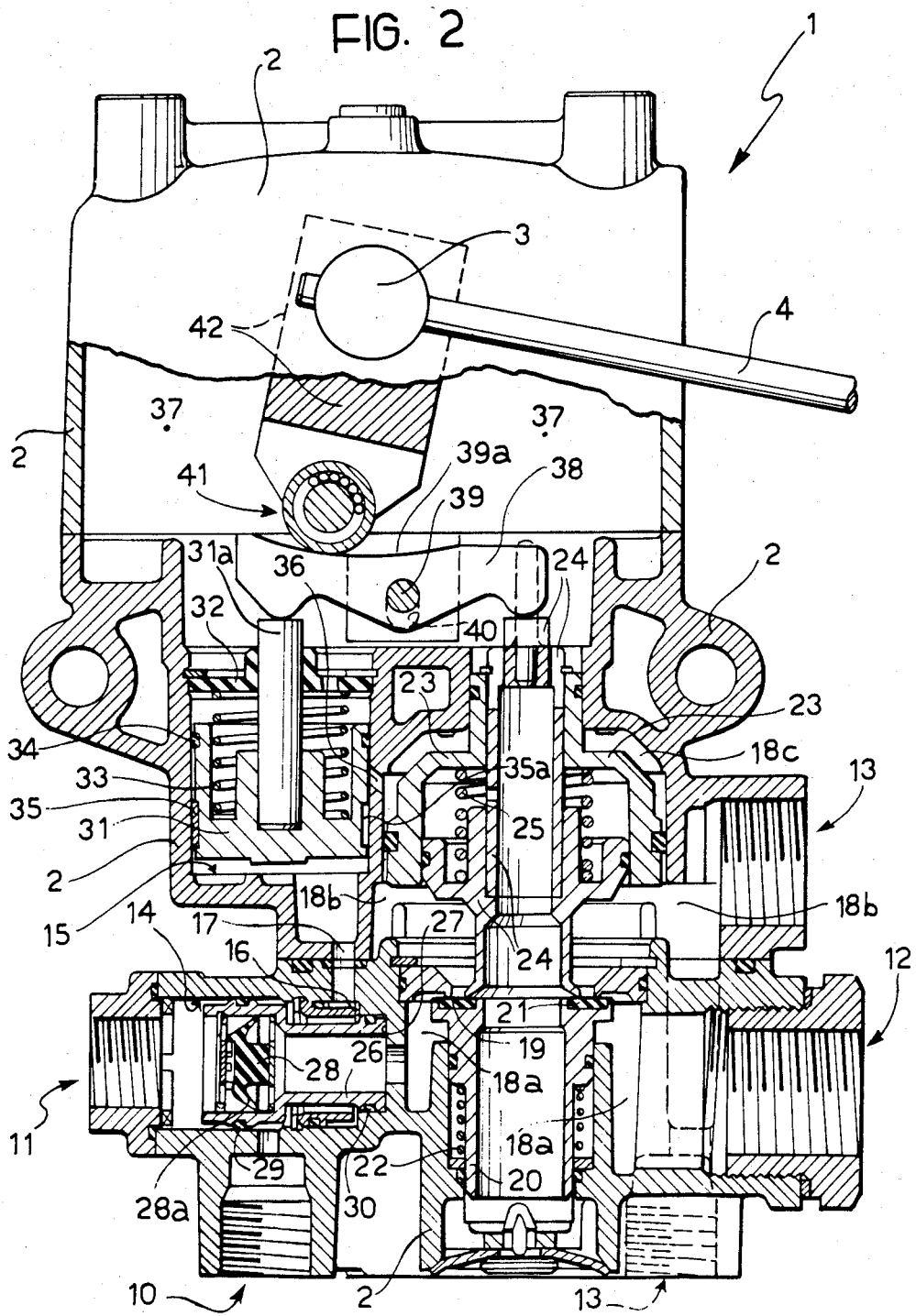

Further characteristics and advantages of the device according to the invention will become apparent from the detailed description which follows, given with reference to the appended drawings, provided purely by way of non-limiting example, in which:

FIG. 1 is a partial side view of a trailer provided with a device according to the invention, FIG. 2 is an axial section of the servo brake automodulator device of the invention shown in FIG. 1, and FIG. 3 is a partially sectioned view of a variant of the device shown in FIG. 2.

With reference to FIG. 1, a servo brake automodulator device according to the invention is generally indicated 1. This device includes a body 2 which, in the condition of use, is fixed to a suspended part C (for example the chassis) of a trailer V (for example a semi-trailer). Through the body 2 extends a pin 3 to which there is fixed a control lever 4 connected through a rod 5 to an unsuspended part of the trailer V, for example the axle. In use, the angular position of the lever 4 changes according to the load bearing on the trailer V.

The automodulator 1 is intended for connection to the pneumatic brake system of the tractor vehicle through a power pipeline, called the automatic pipeline, and a control pipeline, called the variable pipeline. For this purpose, as is seen particularly in FIG. 2, the body 2 has two inlet connectors 10, 11 for connection to the variable pipeline and to the automatic pipeline respectively. The body 2 also has an inlet/outlet connector 12 for connection to a pressure reservoir for the trailer V and a plurality of outlet connectors 13 for connection to the corresponding brake members for the wheels of the trailer V.

Within the body 2 is a distribution chamber 14 communicating with the inlet connectors 10 and 11. This chamber communicates with a control chamber 15 through an interstice 16 and a passage 17. At its end opposite the inlet connector 11, the chamber 14 communicates with a chamber 18a. Through the inlet/outlet connector 12, this chamber 18a communicates with the pressure reservoir for the trailer V.

A further chamber 18b overlies the chamber 18a and can be put in communication with the latter by means of a valve assembly comprising an annular seat 19 and a tubular obturator 20 provided at its upper end with an elastomeric sealing ring 21. The obturator 20 is urged upwardly against the seat 19 by a helical spring 22, as shown in FIG. 2. The position of the obturator 20, as will be apparent from the following, is controlled by two coaxial pistons 23 and 24, of which the first is sealingly slidable in a chamber 18c while the second is sealingly slidable within the first. Between the two pistons is a helical spring 25 biassing the pistons in opposite directions.

In use, when the piston 24 moves the obturator 20 away from its seat 19, the pressure reservoir of the trailer V is put in communication with the brake members through the inlet/outlet connector 12, the chamber 18a, the chamber 18b and the outlet connector 13. The braking force applied to the brake members is thus greater, the greater the control pressure supplied to the connector 10.

Within the distribution chamber 14 is a tubular member 26 which is movable between a normal working position, shown in FIG. 2, in which it bears against an abutment shoulder 27 adjacent the chamber 18a, and an emergency position, in which it bears against the connector 11. Within the tubular member 26 there is a sealing member 28 of elastomeric material having an outer circumferential annular sealing lip 28a which cooperates with the inner surface of the tubular member 26. The sealing member 28 acts as a non-return valve and allows compressed air to pass through the tubular member 26 solely in the direction from the inlet connector 11 to the chamber 18a. In use, this valve enables compressed air to be supplied to the reservoir of the trailer V through the automatic pipeline, the connector 11, the chamber 14, the member 26, the chamber 18a and the inlet/outlet connector 12.

The end of the tubular member 26 facing the connector 11 has a larger diameter and carries, on its external surface, a sealing ring 29 which cooperates with the wall of the chamber 14 to prevent communication between the inlet connectors 10 and 11. The other end of the tubular member 26 has a smaller diameter and carries a sealing ring 30, which also cooperates with a portion of the wall of the chambers 14. The tubular member 26 operates as a differential piston and when it is in its normal working position, illustrated in FIG. 2, the sealing ring 30 is located intermediate the abutment surface 27 and the interstice 16, allowing communication between the inlet connector 10 and the chamber 15 through the chamber 14.

When the member 26 moves into the emergency position, the sealing ring 30 moves (towards the left as seen in FIG. 2) beyond the interstice 16, cutting off communication between the inlet connector 10 and the control chamber 15, and putting the latter into communication with the chamber 18a and hence with the pressure reservoir of the trailer V.

A piston 31 is movable in the control chamber 15 and its rod 31a extends through a guide member 32 which defines the top of the control chamber 15. A spring 33 interposed between the guide member and the piston 31 urges the latter downwardly.

The piston 31 carries a sealing ring 34 at its upper end and, at its lower end, a sliding block 35 with a longitudinal slot or notch 35a.

In FIG. 2 a through hole in the wall separating the chambers 15 and 18c is indicated 36. The diameter of the piston 31 is slightly less than the internal diameter of the chamber 15, whereby that part thereof located beneath the piston is in permanent communication with the chamber 18c above the piston 23 through the slot 35a in the sliding block 35 and the hole 36.

A rocker arm 38 is pivotably mounted in a space 37 in the body 2 above the closure member 32 and, in an intermediate portion thereof, carries a pin 39 the ends of which are engaged in corresponding slots or recesses 40 in the body 2 with the possibility of movement. The ends of the rocker arm 38 bear on the end of the rod 31a of the piston 32 and on the end of the piston 24 respectively. The rocker arm has an upper arcuate surface 39a on which runs a roller 41 carried by a member 42 traversed by the pin 3 and fixed thereto. The point of contact of the roller 41 with the rocker arm 38 in fact constitutes the fulcrum of the rocker arm. As the load bearing on the trailer V varies, the angular position of the lever 4 varies and hence the angular position of the roller 41 relative to the rocker arm varies. The actual fulcrum of the rocker arm 38 thus moves in accordance with the load on the trailer V.

The device described above operates as follows.

When the driver of the tractor vehicle applies the brakes and a brake operating pressure is supplied to the inlet connector 10 through the variable pipeline, the part of the control chamber 15 beneath the piston 31 is pressurised.

The pressure in this chamber reaches the chamber 18c through the slot 35a in the sliding block 35 and the hole 36.

From the moment at which a brake operating pressure is applied to the inlet connector 10, the device operates in two successive time intervals: the first of these is the period in which the force exerted on the piston 31 as a result of the increase in pressure in the chamber 15 is less than the force exerted on the piston by the biassing spring 33. The second corresponds to the period starting with the initiation of the upward movement of the piston 31 when the force exerted on this piston by the pressure in the chamber 15 overcomes the biassing force of the spring 33.

In the first interval, the pressure in the chamber 15 is propagated to the portion of the chamber 18c above the piston 23, causing the descent of the latter and of the piston 24 (as a result of the compression of the spring 25). The obturator 20 leaves its seat 19 and the pressure in the reservoir is propagated to the lower portion of the chamber 18b and to the outlet connectors 13. The pressure in the lower portion of the chamber 18b acting on the surface of the piston 24 causes the piston to rise, with further compression of the spring 25; the piston 23 does not move in this phase since its surface exposed to the pressure in the upper part of the chamber 18c is much greater than its surface exposed to the pressure in the chamber 18b. The rise of the piston 24 causes the temporary interruption of the pressure supply to the brake actuators.

In this situation the second period of operation starts.

The pressure in the lower part of the chamber 15 causes the piston 31 to rise and the rocker arm 38 to rotate correspondingly in a clockwise sense about its point of contact with the roller 41. The rocker arm thus causes the descent of the piston 24 and the consequent opening of the valve 19-20. Thus the pressure supplied to the brake actuators is increased until the brake operating pressure in the variable pipeline is balanced.

Clearly the braking pressure applied to the brake members in the second period of operation depends on the magnitude of the operating pressure supplied by the variable pipeline and the position of the actual fulcrum of rotation of the rocker arm 28 and hence on the load bearing on the trailer V.

As the brake operating pressure in the inlet connector 10 is reduced, the device returns to the initial conditions and, in particular, the obturator 20 returns to its seat 19.

Should the automatic pipeline be broken or become detached during travel, the tubular member 26 leaves the position illustrated in FIG. 2 and is brought against the inlet connector 11 as a result of the force exerted on it by the pressure in the trailer reservoir following closure of the non-return valve 28. The sealing ring 27 carried by the tubular element passes the interstice 16, uncoupling the control chamber 15 from the inlet connector 10 and putting this chamber in communication with the pressure reservoir of the trailer V. In a manner similar to that described above, there is a first operating interval in which the pressure increase in the chamber 15 is insufficient to raise the piston 31 and then a second interval in which the degree of opening of the valve 19-20 depends, through the rocker arm 38, on the load bearing on the trailer. The trailer is thus braked with a brake pressure commensurate with the load.

The servo automodulator described above thus complies with safety regulations which require trailers to be braked automatically if the automatic pipeline is broken or becomes detached. It has the advantage over prior art devices of causing a braking force to be applied which, under emergency conditions, is commensurate with the load bearing on the trailer.

The variant illustrated in FIG. 3 differs from the device shown in FIG. 2 only in that it comprises further a helical spring 60 disposed within the tubular member 26 and reacting against member 26 at one end and against the abutment shoulder 27 at the other end.

The spring 60 allows an important additional function to be achieved, which will be now described.

Let us suppose that the brake system of the trailer is discharged: this may happen in the case of brand-new trailer or because of a leak caused for example by a hole in the trailer's pressure reservoir. In this condition the helical spring 60 maintains the tubular member 26 in the position shown in FIG. 3, i.e. against inlet connector 11. Then, if we begin charging the trailer's brake system by supplying pressure at connector 11, the pressurized air is initially sent to the reservoir through the non-return valve 28, the tubular member 26, the chamber 18a and the connector 12. A portion of this air reaches also the control chamber 15, through interstice 16 and passage 17, and moves piston 31 upwards. The latter, through the rocker arm 38 and the pistons 23 and 24, causes the opening of valves 19-21, so that pressurised air is supplied to the brake members of the trailer through connector 13: the trailer is kept braked. When the pressure in the reservoir reaches a predetermined value, the difference between the pressures acting on the larger diameter portion and the smaller diameter portion of the tubular piston 26 overcomes the resistance of the spring 60, and the piston 26 moves to the right (position of FIG. 2): when the sealing ring 30 moves beyond the interstice 16, chamber 15 is no longer pressurized but rather it is put in communication with connector 10 which in these circumstances communicates with the atmosphere. The pressure in chamber 15 decreases tending to the atmospheric pressure: the pistons 23 and 24 move upwards while piston 31 goes downwards. The valve 19-21 closes and the brake members are put in communication with the atmosphere through the tubular obturator 20 and the vent valve 50: the trailer is no longer braked and can be displaced.

The spring 60 thus causes the trailer to be automatically braked, when the brake system is being charged, up to when the pressure in the trailer's reservoir reaches a predetermined minimum value.

I claim:

1. A servo brake automodulator for a trailer having a pneumatic brake system connectible to the system of the tractor vehicle through a power pipeline, called the automatic pipeline, and a control pipeline called the variable pipeline; the servo automodulator comprising:

a body adapted to be mounted on a suspended part of the trailer and having first and second inlet connectors for connection to the variable pipeline and the automatic pipeline respectively, an inlet/outlet connector and an outlet connector for connection to a pressure reservoir and to the brake members of the trailer respectively, a one-way flow valve mounted in the body and arranged to allow pressurized air to flow from the second inlet connector to the inlet/outlet connector to supply compressed air to the reservoir, a valve assembly mounted in the body and arranged to put the inlet/outlet connector in communication with the outlet connector when a brake actuating pressure is applied to the first inlet connector, and a brake-pressure modulator device including an operating piston movable in a control chamber communicating with the first inlet connector and sensor means for sensing the load bearing on the trailer; said sensor means being operatively interposed between said operating piston and valve assembly to control the opening of the valve assembly and hence the brake pressure in dependence on the load bearing on the trailer and the pressure supplied to the said control chamber, a distribution chamber located in said body in communication with said first and second inlet connectors, with the inlet/outlet connector and with said control chamber in which a control distubuter member is movable, and said control distributor member comprising a tubular member axially and sealingly movable in said distribution chamber between a normal working position in which it allows communication between the first inlet connector and the said control chamber when the said second inlet connector is supplied with pressurized air and an emergency position in which it cuts off communication between the first inlet connector and the said control chamber and in which it puts said control chamber in communication with the inlet/outlet connector, said tubular member having said one way valve disposed therein to allow compressed air to pass through it from said second inlet connector to said inlet/outlet connector and said reservoir while preventing air from flowing back through the tubular body when the pressure supplied to said second inlet connector falls below a predetermined value thereby causing movement of the distributor member from its normal working position of its emergency working position, whereby the pressure applied through the outlet connector to the brake members in these conditions is also a function of the load bearing on the trailer.

2. The servo automodulator according to claim 1, wherein the one-way flow valve comprises a lip valve obturator mounted in the tubular member and arranged, when the pressure supplied to the second inlet connector falls below a predetermined value, to establish sealing contact with the inner surface of the tubular body.

3. The servo automodulator according to claim 2, wherein the tubular member carries external sealing means cooperating with the wall of the distribution chamber so as to prevent communication between the first and second inlet connectors through the distribution chamber permanently.

4. The servo automodulator according to claim 3, wherein the tubular member carries further external sealing means cooperating with the wall of the distribution chamber so as respectively to allow and prevent communication between the first inlet connector and the chamber in which the operating piston is mounted when the tubular member is in its normal working position and in its emergency working position respectively.

5. The servo automodulator according to claim 4, wherein the end portion of the distributor member facing the second inlet connector has a diameter larger than the diameter of the other end portion of said member.

6. The servo automodulator according to claim 1, comprising control means adapted to cause the automatic braking of the trailer till when, during a charging of the trailer's braking system, the pressure in the trailer's reservoir reaches a predetermined minimum value.

7. The servo automodulator according to claim 6, wherein said control means include resilient means cooperating with said distributor member so as to urge and hold said distributor member in said emergency position till when the pressure stored in the trailer's reservoir reaches said predetermined minimum value.

8. The servo automodulator according to claim 7, wherein said resilient means comprise a helical spring disposed within said distributor member and reacting at one end against said member and against an abutment of said body at the other end.

* * * * *